United States Patent
Blanchet

(10) Patent No.: US 10,014,537 B2
(45) Date of Patent: Jul. 3, 2018

(54) DYNAMIC DECOMPRESSION CONTROL FOR HIGH PRESSURE SEALS

(71) Applicant: Nuvera Fuel Cells, LLC, Billerica, MA (US)

(72) Inventor: Scott Blanchet, Chelmsford, MA (US)

(73) Assignee: Nuvera Fuel Cells, LLC, Billerica, MA (US)

(*) Notice: Subject to any disclaimer, the term of this patent is extended or adjusted under 35 U.S.C. 154(b) by 0 days.

(21) Appl. No.: 15/875,458

(22) Filed: Jan. 19, 2018

(65) Prior Publication Data
US 2018/0145348 A1 May 24, 2018

Related U.S. Application Data

(63) Continuation of application No. 14/334,772, filed on Jul. 18, 2014, now Pat. No. 9,911,993.
(Continued)

(51) Int. Cl.
*H01M 8/0438* (2016.01)
*C25B 1/12* (2006.01)
(Continued)

(52) U.S. Cl.
CPC ............ *H01M 8/0438* (2013.01); *C25B 1/12* (2013.01); *C25B 15/02* (2013.01); *H01M 8/04298* (2013.01); *Y02E 60/366* (2013.01)

(58) Field of Classification Search
CPC ........ H01M 8/0438–8/04432; H01M 8/04313; H01M 8/04664–8/04686; H01M 8/24
See application file for complete search history.

(56) References Cited

U.S. PATENT DOCUMENTS

| 3,415,247 A | 12/1968 | Louvel et al. |
| 3,533,852 A | 10/1970 | Baker et al. |

(Continued)

OTHER PUBLICATIONS

Jaravel, Julien et al., "On Key Parameters Influencing Cavitation Damage Upon Fast Decompression ina Hydrogen Saturated Elastomer," *Elsevier-Polymer Testing* 30 (2011) 811-818, www.elsevier. com/locate/polytest; © 2011 Elsevier Ltd.
(Continued)

*Primary Examiner* — Kristina R Fulton
*Assistant Examiner* — L. Susmitha Koneru
(74) *Attorney, Agent, or Firm* — Finnegan, Henderson, Farabow, Garrett & Dunner LLP

(57) ABSTRACT

The present disclosure is directed to a method and system for dynamically controlling seal decompression. The method includes monitoring a set of parameters associated with an operation of a seal, wherein the set of parameters includes a maximum pressure subjected to the seal and an exposure time at the maximum pressure, calculating a target pressure ramp down rate based on at least one of the maximum pressure and the exposure time, and decreasing a pressure about the seal at a decompression rate that is based on the target pressure ramp down rate. The system includes a controller having a memory device, a graphical user interface, at least one pressure transmitter configured to monitor the pressure about the seal, and a processor, wherein the processor is configured to detect a maximum exposure pressure and exposure time at maximum pressure about the seal and control a pressure ramp down about the seal based on the maximum exposure pressure and the exposure time detected in order to prevent explosive decompression of the seal.

11 Claims, 7 Drawing Sheets

Related U.S. Application Data

(60) Provisional application No. 61/857,281, filed on Jul. 23, 2013.

(51) Int. Cl.
*C25B 15/02* (2006.01)
*H01M 8/04298* (2016.01)

(56) References Cited

U.S. PATENT DOCUMENTS

| | | |
|---|---|---|
| 3,573,104 A | 3/1971 | Snyder, Jr. et al. |
| 3,573,105 A | 3/1971 | Weininger et al. |
| 3,585,077 A | 6/1971 | Waldman |
| 3,623,913 A | 11/1971 | Adlhart et al. |
| 2004/0209127 A1 | 10/2004 | Wang et al. |
| 2005/0214979 A1* | 9/2005 | Suzuki ............... H01L 21/50 438/118 |
| 2006/0049039 A1 | 3/2006 | Brand et al. |
| 2015/0044024 A1* | 2/2015 | Donnelly ............... F01D 3/04 415/36 |

OTHER PUBLICATIONS

PCT Notification of Transmittal of the International Search Report and the Written Opinion of the International Searching Authority in International Patent Application No. PCT/US2014/047181 dated Nov. 25, 2014.

Yamabe, J. et al., "Influence of Fillers on Hydrogen Penetration Properties and Blister Fracture of Rubber Composites for O-Ring Exposed to High Pressure Hydrogen Gas," *International Journal of Hydrogen Energy*, Elsevier Science Publishers B.V., Barking, GB, vol. 34, No. 4, pp. 1977-1989, Jan. 11, 2009.

Examination Report for Australian Patent Application No. 2014293442, dated Jan. 3, 2018, 5 pages.

* cited by examiner

DYNAMIC DECOMPRESSION CONTROL FOR HIGH PRESSURE SEALS

This application is a continuation application of U.S. patent application Ser. No. 14/334,772, filed on Jul. 18, 2014, which claims priority to U.S. Provisional Patent Application No. 61/857,281, filed on Jul. 23, 2013, the entire contents of which are incorporated herein by reference.

The present disclosure is directed towards seals operating at high pressure in a hydrogen environment, and more specifically, to dynamically controlling decompression of high pressure seals.

Seals are devices designed to join components or mechanisms to together by preventing leakage, containing pressure, or excluding contamination. Seals come in a variety of configurations. For example, a seal can take the form of a flange gasket, o-ring, hose coupling, etc. Seals also come in a variety of materials, for example, synthetic rubbers such as butyl, polytetrafluoroethylene (PTFE), polyisoprene, silicone or thermoplastics such as elastomer, polyurethane, or polyamide.

Seal failure can occur for a variety of reasons depending on the seal, application, environment, and fluid in contact with the seal. For example, one particular mechanism for seal failure when handling a small molecule gas (e.g. hydrogen) is the failure of seal materials due to explosive decompression. Explosive decompression can be caused by a sudden decrease in pressure, which results in the sudden expansion of gas trapped within the seal structure as the surrounding pressure decreases. Due to the relatively slow rates of diffusion for hydrogen in solid materials (e.g., polymeric and elastomeric), when the surrounding pressure changes at a rate faster than the trapped gas can escape, gas pockets can form inside the material, which can tear apart the material from the inside out.

A particular application where explosive decompression presents a challenge is in high pressure electrochemical cells utilizing hydrogen. Electrochemical cells usually classified as fuel cells or electrolysis cells, are devices used for generating current from chemical reactions, or inducing a chemical reaction using a flow of current. For example, a fuel cell converts the chemical energy of a fuel (e.g., hydrogen, natural gas, methanol, gasoline, etc.) and an oxidant (air or oxygen) into electricity and waste products of heat and water.

The basic technology of a hydrogen fuel cell can be applied to electrochemical hydrogen manipulation, such as, electrochemical hydrogen compression, purification, or expansion. An electrochemical hydrogen compressor (EHC), for example, can be used to selectively transfer hydrogen from one side of a cell to another. EHCs operating in this manner are sometimes referred to as a hydrogen pumps. When the hydrogen accumulated is restricted to a confined space, the electrochemical cell compresses the hydrogen. In some case a hydrogen compressor can compress hydrogen to pressures up to or exceeding 15,000 psi. The maximum pressure or flow rate an individual cell is capable of producing can be based on the cell design.

Electrochemical hydrogen manipulation has emerged as a viable alternative to the mechanical systems traditionally used for hydrogen management. Successful commercialization of hydrogen as an energy carrier and the long-term sustainability of a "hydrogen economy" depends largely on the efficiency, safety, and cost-effectiveness of fuel cells, electrolysis cells, and other hydrogen manipulation/management systems (i.e., EHCs). Gaseous hydrogen is a convenient and common form for energy storage, usually by pressurized containment. Advantageously, storing hydrogen at high pressure yields high energy density. Therefore, there is a need to address the issue of explosive decompression, particularly with regard to high pressure electrochemical cells.

One proposed solution to this issue of explosive decompression for high pressure electrochemical cell applications is decompressing the electrochemical stack or cell at a fixed rate slower than the rate at which the hydrogen can leak from the material. However, this limits the potential response time of the system in situations where the rate is too conservative.

In consideration of the aforementioned circumstances, the present disclosure is directed to a dynamic decompression control method and system for high pressure seals.

One embodiment of the present disclosure is directed to a method of dynamically controlling seal decompression. The method comprises monitoring a set of parameters associated with an operation of a seal, wherein the set of parameters includes a maximum pressure subjected to the seal and an exposure time at the maximum pressure, calculating a target pressure ramp down rate based on at least one of the maximum pressure and the exposure time, and decreasing a pressure about the seal at a decompression rate that is based on the target pressure ramp down rate.

In another embodiment, the calculation of the target pressure ramp down rate is further based on the seal material of construction. In another embodiment, the set of parameters further comprises gas source, hydrogen partial pressure in the gas source, temperature, humidity and seal age. In another embodiment, at least a portion of the seal is formed of EPDM, Viton, nylon, valox, polycarbonate, silicone, polyethylene, polypropylene, polyurethane, polyethylene terephthalate, and polyethylene naphthalate. In another embodiment, the environment about the seal contains hydrogen.

Another embodiment of the present disclosure is directed to a method of dynamically controlling decompression for an electrochemical stack. The method comprises detecting a maximum exposure pressure and an exposure time at maximum pressure for the electrochemical stack and controlling the pressure ramp down of the electrochemical stack based on the maximum exposure pressure and the exposure time detected in order to prevent explosive decompression of the electrochemical stack.

In another embodiment, controlling decompression of the electrochemical stack is further based on the electrochemical stack materials of construction. In another embodiment, the electrochemical stack includes seals formed of EPDM, Viton, nylon, valox, polycarbonate, silicone, polyethylene, polypropylene, polyurethane, polyethylene terephthalate, and polyethylene naphthalate. In another embodiment, the electrochemical stack gas source is hydrogen.

Another embodiment of the present disclosure is directed to a system for dynamically controlling decompression for an electrochemical stack. The system comprising an electrochemical stack and a controller, wherein the controller is configured to detect maximum exposure pressure and exposure time at maximum pressure for the electrochemical stack and control a pressure ramp down of the electrochemical stack based on the maximum exposure pressure and the exposure time detected in order to prevent explosive decompression of the electrochemical stack.

In another embodiment, the control of the pressure ramp down is further based on the electrochemical stack materials of construction. In another embodiment, the electrochemical stack is configured to operate at operating pressure ranging from about 0 psi to about 15,000 psi.

Another embodiment of the present disclosure is directed to a system for dynamically controlling seal decompression. The system comprising a controller comprising a memory device, a graphical user interface, at least one pressure transmitter configured to monitor the pressure about the seal, and a processor, wherein the processor is configured to detect a maximum exposure pressure and exposure time at maximum pressure about the seal and control a pressure ramp down about the seal based on the maximum exposure pressure and the exposure time detected in order to prevent explosive decompression of the seal.

In another embodiment, the control of the pressure ramp down is further based on the seal material of construction. In another embodiment, the environment about the seal contains hydrogen.

Another embodiment of the present disclosure is directed to a method of dynamically controlling seal decompression by executing an integrating function to accumulate a total exposure time at time-varying pressure levels for the seal, wherein a target ramp down rate can be calculated based on a pressure-weighted function.

It is to be understood that both the foregoing general description and the following detailed description are exemplary and explanatory only and are not restrictive of the disclosure, as claimed.

The accompanying drawings, which are incorporated in and constitute a part of this specification, illustrate embodiments of the present disclosure and together with the description, serve to explain the principles of the disclosure.

Reference will now be made in detail to the present exemplary embodiments of the present disclosure, examples of which are illustrated in the accompanying drawings. Wherever possible, the same reference numbers will be used throughout the drawings to refer to the same or like parts. Although described in relation to electrochemical cells and stacks employing hydrogen, it is understood that the methods and systems of the present disclosure can be employed with various types of pressurized sealed systems.

Figure 1:
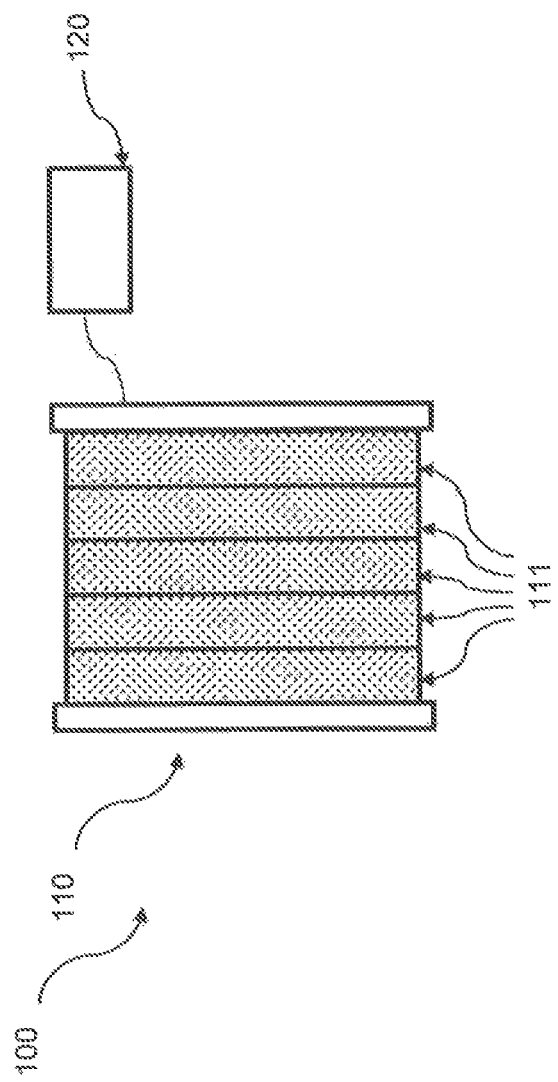
FIG. 1 is a schematic view of part of an electrochemical stack system, according to an exemplary embodiment.

FIG. 1 shows a portion of an electrochemical stack system 100, according to an exemplary embodiment. The electrochemical stack system 100 can comprise an electrochemical stack 110 and a controller 120 in communication with electrochemical stack 110. As shown in FIG. 1, electrochemical stack 110 can be comprised of multiple electrochemical cells 111 stacked adjacent to one another to form electrochemical stack 110. Controller 120 can be configured to be separate from stack 110 as shown in FIG. 1 or according to various other embodiments controller 120 can be configured to be integrated within stack 110. In other embodiments, controller 120 can be configured to communicate and control a plurality of electrochemical stacks.

In operation, according to an exemplary embodiment, hydrogen gas can be supplied to electrochemical stack 110 and distributed to each electrochemical cell 111. An electric potential can be applied and the hydrogen within each electrochemical cell 111 can be oxidized causing the hydrogen to split into electrons and protons. The protons are electrochemically transported through a proton exchange membrane (not shown) within each electrochemical cell 111 while the electrons are rerouted around. At the opposite side the proton exchange membrane transported protons and rerouted electrons are reduced to form hydrogen. As more and more hydrogen is formed at the opposite side the hydrogen can be compressed and pressurized within a confined space.

Within each electrochemical cell 111 and within electrochemical stack 110, a plurality of high pressure zones and a plurality of seals can define the plurality of pressure zones. The components (e.g., plates, seals, etc.) acting as the boundary to each pressure zone can be exposed to the hydrogen gas at varying pressure. For example, the pressure within electrochemical stack 110 can range from about 0 psi to about 15,000 psi.

In operation, at least a portion of the hydrogen gas exerting force due to pressure on the seals can diffuse into the seal material (e.g., polymers and elastomers). The quantity of hydrogen that diffuses into the seal material can be based on the hydrogen pressure being exerted on the seals and the period of exposure. There can be a period of time at which a seal can be saturated for a given pressure and diffusion of hydrogen into the seal material will stop. This saturation time, which can be dependent on the hydrogen pressure, can be referred to as $t_{max}$. According to the various embodiments, the materials of construction can be considered in determining the saturation time $t_{max}$. In addition, the seal geometry (e.g., thickness) can affect the saturation time $t_{max}$. The saturation time $t_{max}$ can be a combined function of the geometry and diffusivity of the material of construction.

Electrochemical stack 110 can operate at different pressures for different durations depending on various factors, for example, application, load requirements, etc. The pressure within electrochemical stack 110 may decrease for various reasons, for example, a change in operating parameters or as part of a shutdown. For an emergency shutdown, the pressure can vary from operating pressure to ambient for safety and servicing reasons. Under normal operating conditions the outlet of electrochemical stack 110 can be exposed to various pressure levels in storage vessels.

Ramping down the pressure within electrochemical stack 110 at a rate faster than the hydrogen gas can diffuse out of the seal material can cause gas pockets to form internal to the seal structure. Consequently, as the external hydrogen pressure decreases the volume of the gas pockets increases producing high internal stress, which can cause the seal to deform and be torn apart (i.e., explosive decompression).

To reduce the potential for explosive decompression, the rate of decompression (i.e., the pressure ramp down rate) within electrochemical cell 110 can be controlled to limit the formation of gas pockets internal to the seal material and maintain low internal stress. Controlling the pressure ramp down rate can include reducing the pressure of the hydrogen gas within electrochemical stack 110 at a rate slow enough to allow the hydrogen that diffused into the seal material to diffuse back out of the seal as a result of the pressure differential without forming gas pockets and high internal stress within the seal.

As briefly discussed above, the pressure ramp down rate can be controlled to a fixed rate of decompression based on a given scenario. For example, the fixed rate of decompression can be calculated based on the worst case scenario, which would be the maximum operating pressure of the electrochemical stack and an exposure time of $t_{max}$. Calculating the fixed rate of decompression based on the worst case scenario can ensure that the decompression will be sufficiently slow regardless of the operating pressure or the time of exposure. However, controlling based on the worst case scenario can result in inefficiency due an overly conservative ramp down time when the electrochemical cell is operating at less than maximum operating pressure or maximum exposure time.

Alternatively, calculating the fixed rate of decompression based on average operating pressure and exposure time can still create situations where explosive decompression may occur. Therefore, because response time of an electrochemical stack can be an important factor in operation, performance, and efficiency of the stack it can be advantageous to dynamically control the decompression of the electrochemical stack in real time. For example, a ramp down time for an electrochemical stack operating at a pressure of about 15,000 psi to 0 psi might be about 30 minutes controlling based on a fixed ramp down rate at worst case scenario. By dynamically controlling pressure, time can be reduced to less than about 5 minutes in a situation where the exposure time at about 15,000 psi is relatively short.

Electrochemical stack system 100, according to the present embodiment can be configured to dynamically control decompression of electrochemical stack 110 by calculating the pressure ramp down rate based on the time-history of the electrochemical stack prior to initiating a decompression transition. Controller 120 can be configured to monitor the time-history parameters and use the parameters to calculate a target pressure ramp down rate in real time upon the initiation of a decompression transition. The parameters monitored can include the maximum pressure, the time spent at that pressure and the material(s) of construction for the seal(s). Controller 120 can be configured to use one or more parameters to calculate a ramp down rate based on the time-dependent sum of exposed pressure multiplied by exposure time, with a weighting factor included.

Figure 2:
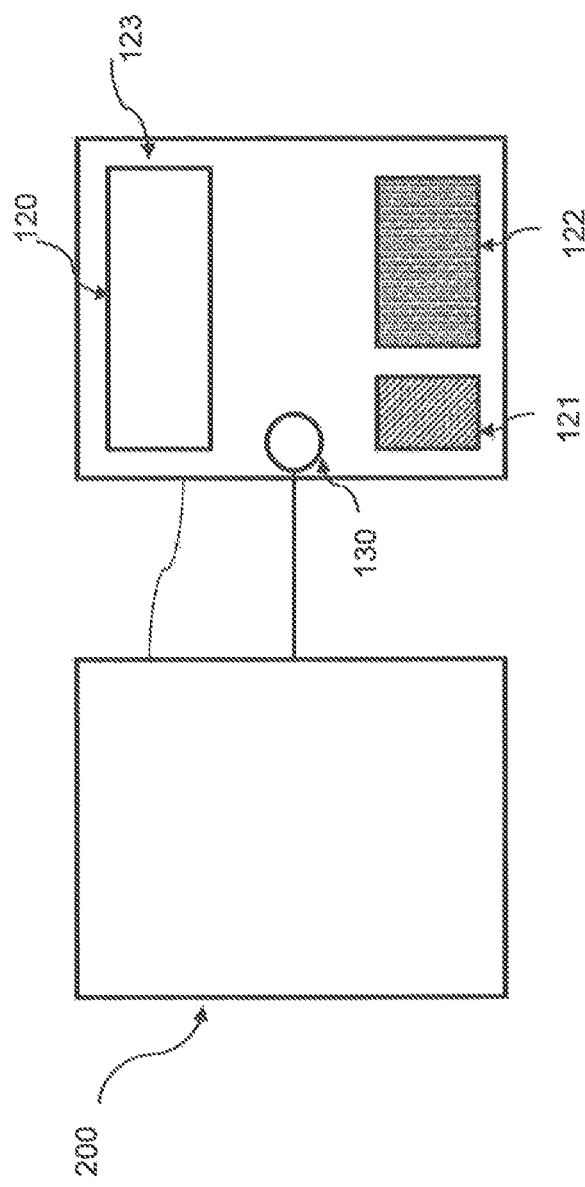
FIG. 2 is a schematic view of part of a controller, according to an exemplary embodiment.

FIG. 2 shows a schematic diagram of controller 120, according to an exemplary embodiment. Controller 120 as shown in FIGS. 1 and 2 can be configured to interface with any pressurized device having seals that undergo decompression.

As shown in FIG. 2, controller 120 can comprise at least one pressure transmitter 130 or other comparable device configured to read the internal pressure of a pressurized device 200. In addition, controller 120 can be in communication with pressurized device 200 and configured to perform the decompression of pressurized device 200 at the target pressure ramp down rate by controlling the inlet and outlet flow for pressurized device 200. The flow can be controlled by the use of valves or other fluid handling components (not shown).

Pressure transmitter 130 can be comprised of one or more pressure transmitters configured to monitor the pressure within at least one pressurized zone within pressurized device 200. For example, pressure transmitter 130 can be configured to monitor the overall pressure of stack 110 or can be configured to monitor the pressure within each individual electrochemical cell 111.

In addition to pressure transmitter 130, controller 120 can be comprised of a processor 121, memory device 122, and a graphical user interface (GUI) 123. Controller 120 can be configured to monitor and record the parameters at a set interval, for example, every 1 min, 30 seconds, 15 seconds, 5 seconds, 1 second, 0.5 seconds, or 0.1 seconds. In addition, controller 120 can be configured to continuously calculate the target ramp down rate based on the most recent parameters. According to an exemplary embodiment, the target ramp down rate can be designed to balance the potential for explosive decompression and excessive ramp down time. GUI 123 can be configured to allow the user to input parameters, for example, the seal material, operating pressure range, PID loop parameters, gas source, seal model, seal geometry, safety factor, etc.

In an alternate embodiment, controller 120 rather than calculating the pressure ramp down rate based on the parameters monitored can utilize a lookup table or database. The lookup table or database can have pre-calculated values for the pressure ramp down rate based on the full range of possible operating pressures, time spent at pressure, and seals materials of construction.

EXAMPLE 1

Figure 3:
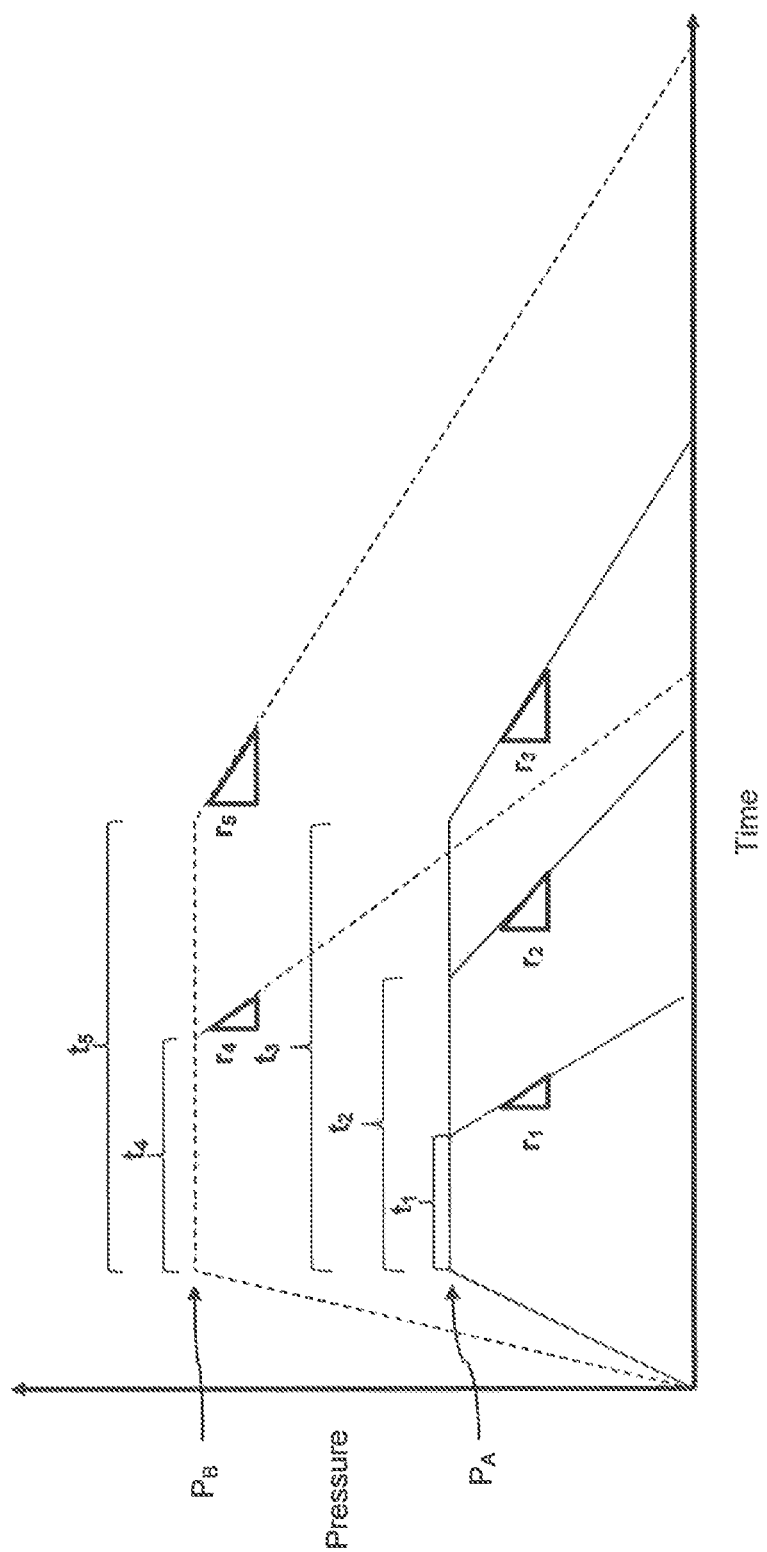
FIG. 3 is a chart of pressure vs. time showing various decompression scenarios, according to an exemplary embodiment.

FIG. 3 shows a chart of pressure vs. time illustrating various decompression scenarios for electrochemical stack 110. The scenarios can be separated into two different pressure levels, $P_A$ and $P_B$. Pressure level $P_B$ is shown as a dotted line and pressure level $P_A$ is shown as a solid line. FIG. 3 illustrates how the ramp down rate r can vary based on maximum operating pressure and exposure time at maximum operating pressure. For the scenarios shown in FIG. 3, the seals materials of construction are assumed to be the same for all the scenarios.

As shown in FIG. 3, the pressure within electrochemical stack 110 can ramp up at different rates as illustrated by the different slopes of $P_A$ and $P_B$. The pressure for both $P_A$ and $P_B$ ramps up until the pressure levels off. As shown in FIG. 3, the pressure for $P_B$ is greater than $P_A$.

Following the pressure leveling off, three different ramp down scenarios are illustrated with regard to $P_A$. The first ramp down scenario occurs when ramp down begins after a duration of $t_1$ at a ramp down rate of $r_1$, the second ramp down scenario occurs when ramp down begins after a duration of $t_2$ at a ramp down rate of $r_2$, and the third ramp down scenario occurs when ramp down begins after a duration of $t_3$ at a ramp down rate of $r_3$. The ramp down rate is equal to the slope of the ramp down line ($\Delta P/\Delta t$).

As shown in FIG. 3, exposure time $t_3$ is greater than exposure time $t_2$ and exposure time $t_2$ is greater than exposure time $t_1$. Accordingly, because for each scenario the maximum pressure is the same, the ramp down rate can vary based on exposure time. Therefore, because $t_1$ is the shortest exposure duration the least amount of hydrogen should have been diffused into the seal material, in which case ramp down rate $r_1$ can be greater than ramp down rate $r_2$ and ramp down rate $r_2$ can be greater than ramp down rate $r_3$ Similarly, as shown in FIG. 3, for pressure level $P_B$, exposure time $t_5$ is greater than exposure time $t_4$. Accordingly, ramp down rate $r_4$ can be greater than ramp down rate $r_5$. In addition, because $P_B$ is greater than $P_A$, if $t_5$ is equal to $t_3$ then $r_3$ can be greater than or equal to $r_5$. Generally, the rate of decompression can be inversely proportional to the time spent at maximum pressure and inversely proportional to the maximum exposed pressure level. It is contemplated that the proportionality for the exposed pressure level can be non-linear.

EXAMPLE 2

Figure 4:
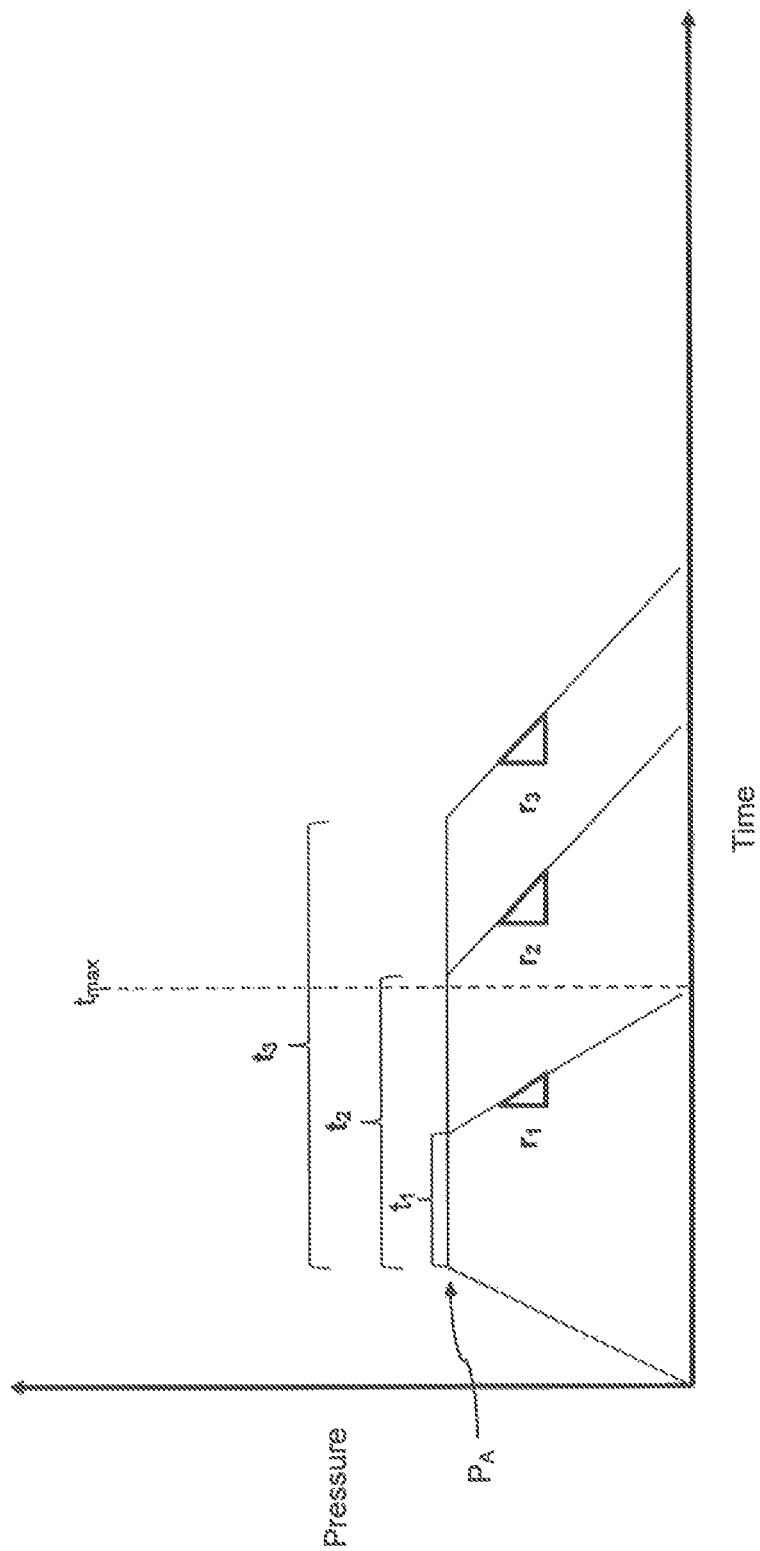
FIG. 4 is a chart of pressure vs. time showing various decompression scenarios, according to an exemplary embodiment.

FIG. 4 shows a chart of pressure vs. time illustrating three decompression scenarios for electrochemical stack 110. FIG. 4 is similar to FIG. 3, except that FIG. 4 only shows pressure level $P_A$ and in FIG. 4 $t_2$ and $t_3$ exceed the saturation time $t_{max}$. Therefore, $r_2$ and $r_3$ are equal assuming the same materials of construction because the saturation time is used as the exposure time for both and the maximum pressure is the same.

EXAMPLE 3

Figure 5:
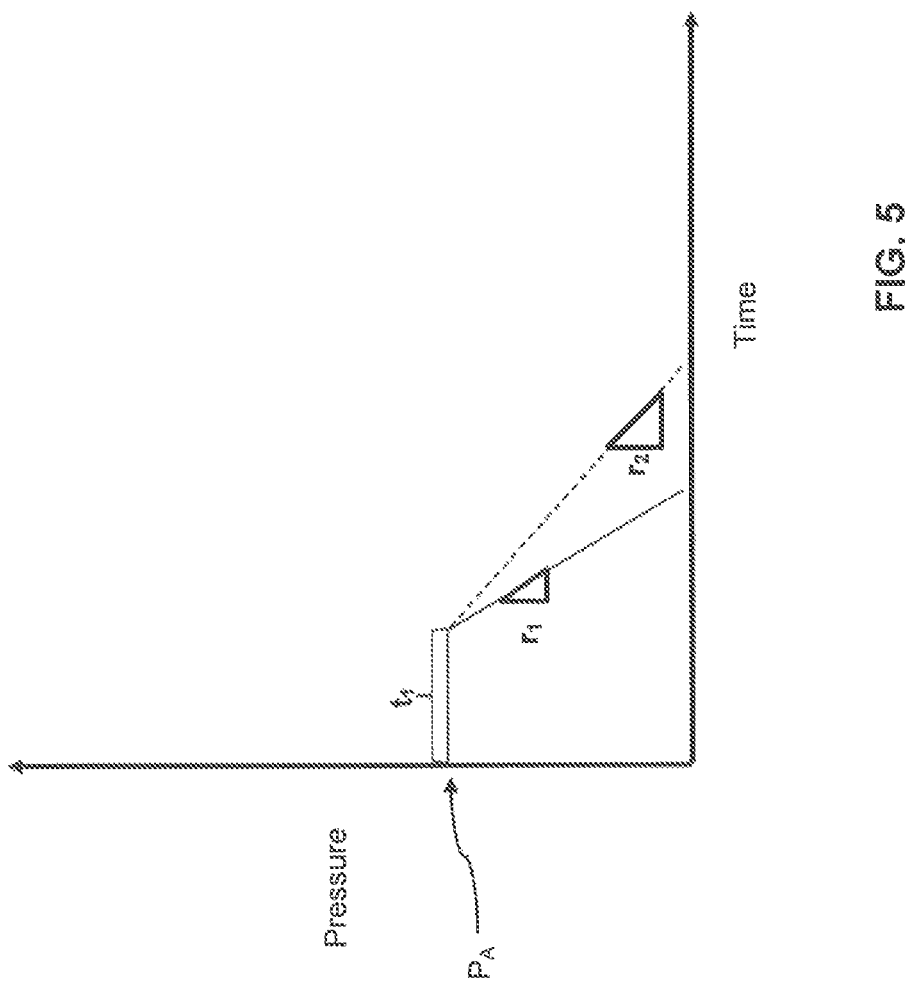
FIG. 5 is a chart of pressure vs. time showing various decompression scenarios, according to an exemplary embodiment.

In contrast, FIG. 5 shows a chart of pressure vs. time illustrating two decompression scenarios where the material of construction for electrochemical stack 110 is different. In both scenarios the exposure time at maximum pressure is equal to $t_1$ and $t_1$ is greater than the saturation time $t_{max}$. In addition, the maximum pressure is equal for both scenarios. Therefore, the difference between the two scenarios can be the material of construction of the boundary components. Scenario 1 can be represented by the solid ramp down line which has a slope $r_1$. Scenario 2 can be represented by the dotted ramp down line which has a slope of $r_2$. Based on FIG. 5, the material of electrochemical stack 110 for scenario 1 has a greater rate of hydrogen diffusion from the seal than the seal of electrochemical stack 110 for scenario 2. Because of the higher rate of hydrogen diffusion for scenario 1 the ramp down rate $r_1$ can be greater than $r_2$ and as a result response time can be less, as illustrated in FIG. 5.

EXAMPLE 4

Figure 6:
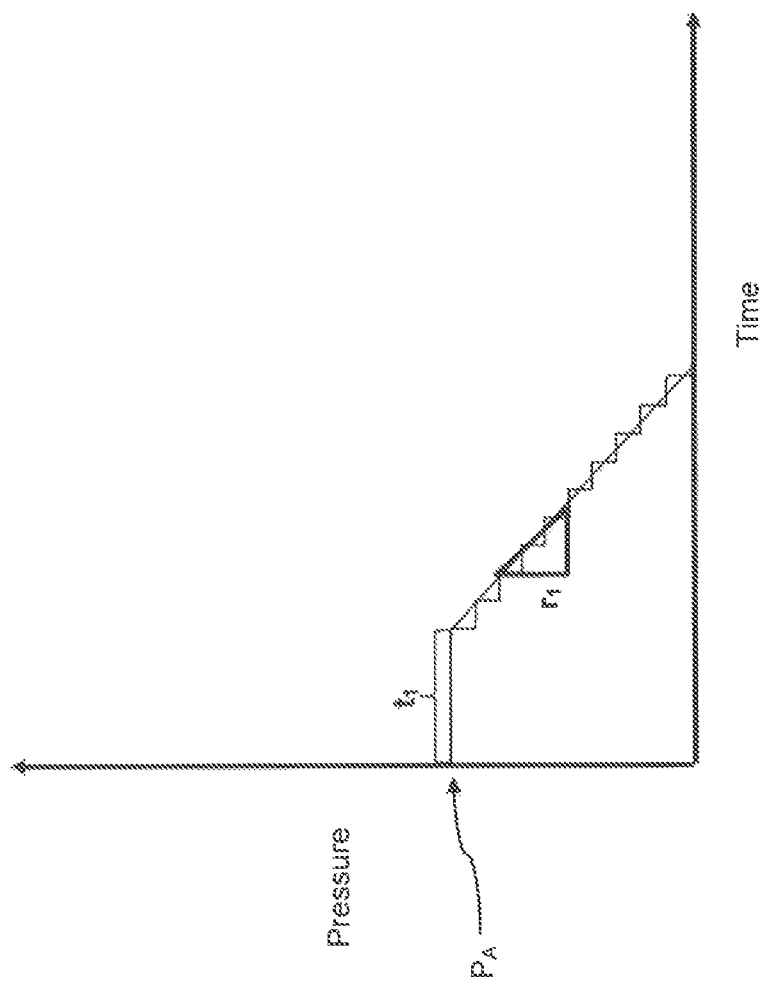
FIG. 6 is a chart of pressure vs. time showing various decompression scenarios, according to various embodiments.

In another embodiment, as shown in FIG. 6, the ramp down can be executed in a plurality of steps rather than a steady gradual decline as shown in FIGS. 3-5. As shown in FIG. 6, the pressure drops down and then substantially stabilizes before dropping down again. The overall rate of decompression for the plurality of step downs can be substantially equal to the overall rate of decompression for the steady ramp down.

In another embodiment, the ramp down rate can be non-linear (e.g., exponential, logarithmic, polynomial). For example, the ramp down rate can be slower at higher pressure and as the pressure decreases the ramp down rate can increase exponentially.

In various embodiments, additional parameters can be monitored and factored into the calculation of the ramp down rate. For example, the gas source, the partial pressure of hydrogen in the gas source, the temperature, the humidity, and the seal age.

In various other embodiments, it is contemplated that the ramp down rate can be recalculated and the ramp down rate can be adjusted upon initiation of the decompression as well as throughout a decompression.

Figure 7:
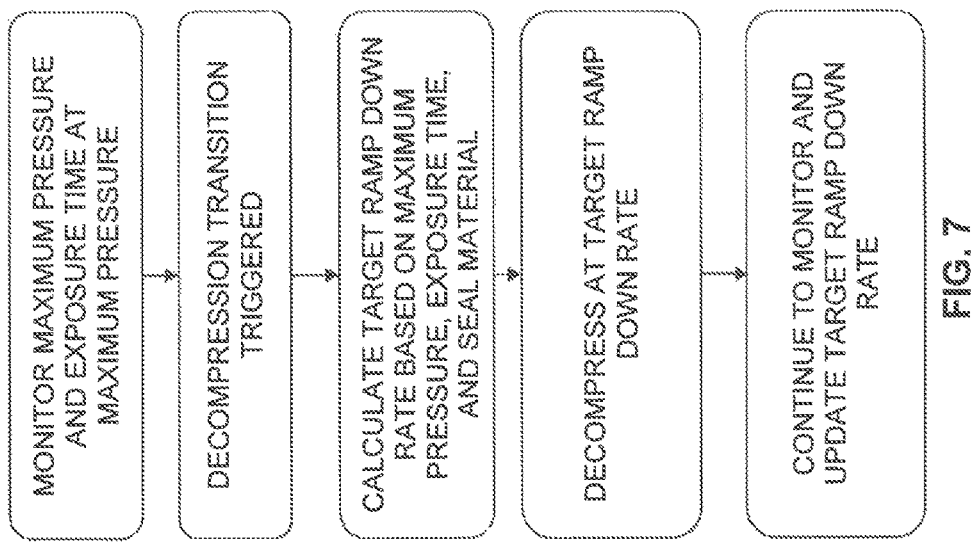
FIG. 7 is a flow chart showing a decompression control method, according to an exemplary embodiment.

FIG. 7 is a flow chart illustrating the various steps of a method of dynamically controlling the decompression for high pressure seals, according to an exemplary embodiment. The method comprises monitoring a set of parameters associated with an operation of a seal. The set of parameters can include the maximum pressure subjected to the seal and the exposure time at the maximum pressure. Once a decompression transition is triggered calculation of the target pressure ramp down rate based on at least one of the maximum pressure and the exposure time can be executed. Then decompression (i.e., decreasing of the pressure) can commence at a decompression rate that is determined based on the target ramp down rate. According to various embodiments, the decompression rate may be equal to the target ramp down rate or the decompression rate may vary from the target ramp down rate by, for example, about +/−1%, 5%, 10%, 20%, 30%, 40%, 50%, or greater than 50%.

According to various embodiments, during the decompression the parameters can be continuously monitored and the target ramp down rate can be updated to provide feedback loop control.

In another embodiment, controller 120 can be configured to perform an integrating function. This function can accumulate the total exposure time at time-varying pressure levels. The ramp down rate can be calculated based on a pressure weighted function. For example, the ramp down rate can be the integral of $P*d(t)$. In yet another embodiment, controller 120 ramp down control can be configured to operate above a certain pressure threshold. For example, controller 120 can start calculating the ramp down rate when pressure within the electrochemical cell rises above about 100 psi, 500 psi, 1,000 psi, 5,000 psi, 10,000 psi, or 15,000 psi.

According to the various embodiments, controlling the ramp down rate can substantially limit or prevent "explosive decompression" to seals in high pressure devices. One particular embodiment is controlling the ramp down rate for electrochemical stacks, which seals can be susceptible to damage from explosive decompression. The seals for an electrochemical stack can be formed from any elastomeric or polymeric material, including, but not limited to, EPDM, Viton, nylon, valox, polycarbonate, silicone, polyethylene, polypropylene, polyurethane, polyethylene terephthalate, and polyethylene naphthalate.

Other embodiments of the present disclosure will be apparent to those skilled in the art from consideration of the specification and practice of the present disclosure herein. It is intended that the specification and examples be considered as exemplary only, with a true scope and spirit of the present disclosure being indicated by the following claims.

What is claimed is:

1. A system for dynamically controlling decompression for an electrochemical cell comprising:
   an electrochemical cell; and
   a controller, wherein the controller is configured to detect maximum exposure pressure and exposure time at maximum pressure for a seal of the electrochemical cell and control a pressure ramp down of the electrochemical cell based on the maximum exposure pressure and the exposure time detected in order to prevent explosive decompression of the seal.

2. The system of claim 1, wherein the control of the pressure ramp down is further based on the materials of construction of the seal.

3. The system of claim 2, wherein at least a portion of the materials of construction of the seal includes EPDM, Viton, nylon, valox, polycarbonate, silicone, polyethylene, polypropylene, polyurethane, polyethylene terephthalate, and/or polyethylene naphthalate.

4. The system of claim 1, wherein the control of pressure ramp down is further based on at least one of a gas source supplying the electrochemical stack, hydrogen partial pressure in the gas source, temperature of the gas source, humidity in the gas source, the seal thickness, the seal geometry, and/or the seal age.

5. The system of claim 1, wherein the electrochemical cell is configured to operate at an operating pressure ranging from about 0 psi to about 15,000 psi.

6. The system of claim 3, wherein the environment about the seal contains hydrogen.

7. A system for dynamically controlling seal decompression of a seal located in a pressurized environment, the system comprising:
   a controller comprising:
      a memory device, a graphical user interface, at least one pressure transmitter configured to monitor the pressure about the seal, and a processor;
      wherein the processor is configured to detect a maximum exposure pressure and exposure time at maximum pressure about the seal and control a pressure ramp down about the seal based on the maximum exposure pressure and the exposure time detected in order to prevent explosive decompression of the seal.

8. The system of claim 7, wherein the control of the pressure ramp down is further based on the material of construction of the seal.

9. The system of claim 8, wherein at least a portion of the material of construction of the seal is formed of EPDM, Viton, nylon, valox, polycarbonate, silicone, polyethylene, polypropylene, polyurethane, polyethylene terephthalate, and/or polyethylene naphthalate.

10. The system of claim 7, wherein the control of the pressure ramp down is further based on at least one of a gas source supplying the pressurized environment, hydrogen partial pressure in the gas source, temperature of the gas source, humidity in the gas source, the seal thickness, the seal geometry, and/or the seal age.

11. The system of claim 7, wherein the pressurized environment about the seal contains hydrogen.

\* \* \* \* \*